US005448761A

United States Patent [19]
Ushirokawa

[11] Patent Number: 5,448,761
[45] Date of Patent: Sep. 5, 1995

[54] CHANNEL ASSIGNMENT IN A CELLULAR MOBILE RADIO NETWORK WITH A CIR THRESHOLD LEVEL SELECTED IN DEPENDENCY ON PRIORITY DEGREES OF CHANNELS USED IN THE NETWORK

[75] Inventor: Akihisa Ushirokawa, Tokyo, Japan

[73] Assignee: NEC Corporation, Tokyo, Japan

[21] Appl. No.: 111,459

[22] Filed: Aug. 25, 1993

[30] Foreign Application Priority Data

Aug. 28, 1992 [JP] Japan .................. 4-229025

[51] Int. Cl.$^6$ .................. H04Q 7/30; H04Q 7/34; H04B 17/00
[52] U.S. Cl. .................. 455/62; 455/33.1; 455/63; 455/67.1; 379/59
[58] Field of Search .................. 455/62, 63, 67.1, 54.1, 455/54.2, 56.1, 34.1, 33.1, 33.2, 33.4; 379/58, 59; 370/95.1

[56] References Cited

U.S. PATENT DOCUMENTS

| | | | |
|---|---|---|---|
| 3,913,017 | 10/1975 | Imaseki | 379/59 |
| 4,435,840 | 3/1984 | Kojimo et al. | 455/56.1 |
| 4,672,657 | 6/1987 | Dershowitz | 379/58 |
| 4,747,101 | 5/1988 | Akaiwa et al. | 455/34.1 |
| 5,289,526 | 2/1994 | Chymyck et al. | 455/67.1 |

FOREIGN PATENT DOCUMENTS 3-104329 5/1991 Japan .

OTHER PUBLICATIONS

Yukitsuna Furyua et al., "Channel Segregation, A Distributed Adaptive Channel Allocation Scheme for Mobile Communication Systems", Second Nordic Seminar on Digital Land Mobile Radio Communication, Oct. 14–16, 1986, pp. 311–315 of the Proceedings.

Primary Examiner—Edward F. Urban
Assistant Examiner—Mark D. Wisler
Attorney, Agent, or Firm—Sughrue, Mion, Zinn, Macpeak & Seas

[57] ABSTRACT

On selecting as a selected channel at a base station in response to a channel assignment request one of transmission channels of a cellular mobile radio communication network when this channel is given a higher updated priority degree in accordance with an interference signal power received through this channel while such requests are not present and furthermore when a CIR of this channel is above a preselected CIR threshold level, the CIR threshold level is selected in dependency on the updated priority degrees given to the transmission channels. Preferably, the CIR threshold level is low and high if the updated priority degree of each channel is high and low at the base station, respectively.

6 Claims, 2 Drawing Sheets

CHANNEL ASSIGNMENT IN A CELLULAR MOBILE RADIO NETWORK WITH A CIR THRESHOLD LEVEL SELECTED IN DEPENDENCY ON PRIORITY DEGREES OF CHANNELS USED IN THE NETWORK

BACKGROUND OF THE INVENTION

This invention relates to a method of assigning transmission channels to base stations in a cellular mobile radio communication network and, more particularly, in a small cell mobile radio communication network.

Such a cellular mobile radio communication network, or cellular mobile radio network, has a service area divided into a plurality of radio zones or cells. A base station or cell site is situated in each radio zone. The base stations of the cellular mobile radio communication network are in this manner in one-to-one correspondence to the radio zones. At least one mobile station is movable in general in the service area from one radio zone to another radio zone. Each base station is assigned at least one transmission channel for use in communication with a mobile station that is present and alive in the corresponding radio zone. ("Present and alive" as used herein denotes having power and available for transmitting and receiving.) As a consequence, the cellular mobile radio communication network is assigned a plurality of transmission channels.

The cellular mobile radio communication network may be an automobile radio communication network, in which case a mobile station comprises communication terminal equipment installed on an automobile. Alternatively, the cellular mobile radio communication network may be a multi-channel cordless telephone network, in which case a mobile station is a cordless telephone set that may be carried by an attendant.

In the cellular mobile radio communication network, two adjacent ones of the radio zones share an overlapped area. These two adjacent zones will be referred to herein as first and second zones. The base stations corresponding to the first and the second zones will be called the first and second stations. While present and alive in the first zone, a mobile station receives a first down signal from the first station and transmits a first up signal to the first station.

It will be assumed merely for brevity of the description that a particular channel of the transmission channels of the cellular mobile radio communication network is used in carrying the first down and up signals. Under the circumstances, the first up signal reaches the first station as a desired signal through this particular channel.

When the mobile station moves into the overlapped area, the first up signal may still be received at the first station as the desired signal. If the particular channel is also being used by the second station, the first up signal reaches the second station as an interference or undesired signal through the particular channel.

The transmission channels must consequently optimally be assigned to the base stations of the cellular mobile radio communication network. In accordance with fixed channel assignment, the transmission channels are fixedly assigned to the base stations. According to one of various strategies of dynamic channel assignment, each base station measures a carrier-to-interference ratio (CIR) of each of the transmission channels of the network upon occurrence of a channel assignment request or call connection request in order to select one of the transmission channels as a selected or favorite channel if it has a carrier-to-interference ratio above a preselected threshold level, herein called a CIR threshold level.

On carrying out this strategy, it is unnecessary for each of adjacent ones of the base stations and the mobile station or stations currently present and alive in the corresponding radio zones of the base station under consideration and of the adjacent ones of the base stations to measure the carrier-to-interference ratio even when the channel is already used thereby. As a result, this strategy is defective in that the channel under consideration may give rise to interference. Moreover, the mobile station may move into the overlapped area, causing the respective powers of the desired signal and interference signal to vary, and giving rise to similar interference.

Should interference takes place, it is necessary to switch channels. This switch between the channels results in an instantaneous suspension or break in the communication. If no other channels are available, the communication must forcibly be suspended. When such suspensions are frequent, a heavy load is unavoidably imposed on control of the channels.

In order to reduce such an interference probability, a "channel segregation" scheme is revealed in a paper contributed by Yukitsuna Furuya and Yoshihiko Akaiwa to the Second Nordic Seminar on Digital Land Mobile Radio Communication held 14–16 Oct. 1986 in Stockholm, Sweden, and printed in Proceedings, pages 311 to 315. This scheme is disclosed in U.S. Pat. No. 4,747,101 (the '101 patent) issued in Yoshihiko Akaiwa and two others, and assigned to the present assignee. This United States Patent is incorporated herein by reference.

In accordance with the channel segregation scheme, each base station assigns priority degrees or transmission priorities to the transmission channels utilized in the cellular mobile radio communication network, and measures, in connection with each transmission channel, the power which an interference signal has. This is referred to herein as "interference signal power". When the interference signal power is lower or higher than a predetermined level, the base station raises or lowers, respectively, one of the priority degrees into an updated priority degree that is assigned to the transmission channel in question. The base station selects an idle one of the transmission channels as the selected channel and assigns it the highest possible updated priority degree if it has a carrier-to-interference ratio above the preselected threshold level.

Meanwhile, the preselected threshold level may be kept constant throughout the transmission channels. Preferably, in order to further reduce the interference probability, the threshold level is controlled on actually selecting the selected channel.

Another excellent control of channel selection is revealed in Japanese Patent Prepublication (A) No. 104,329 of 1991. In accordance with this control, attention is directed to the fact that the interference probability depends on the velocity or speed of the mobile station. The preselected threshold level is therefore determined dependent on the velocity of the mobile station.

According to the channel segregation scheme wherein the preselected threshold level is kept constant throughout the transmission channels, the interference probability is low for the transmission channel that has a high updated priority degree and is consequently frequently used as the selected channel. Conversely, the interference probability is high for the transmission channel that has a low updated priority degree and is consequently only rarely used as the selected channel. This holds true even if the threshold level is raised in connection with each of the transmission channels utilized in the cellular mobile radio communication network. As a result, the channel segregation scheme involves a problem such that the interference probability is not much reduced. Instead, blocking probability (discussed in detail in the paper cited before) grows high.

When the channel segregation scheme is adopted, the interference probability depends little on the velocity of the mobile station. Instead, it has been found by the present inventor that the interference probability depends on the updated priority degrees. As a consequence, it is not effective under the circumstances to control the preselected threshold level in accordance with the velocity of the mobile station.

SUMMARY OF THE INVENTION

It is consequently an object of the present invention to provide a method of assigning transmission channels to base stations of a cellular mobile communication network with interference probability and blocking probability both reduced.

It is another object of this invention to provide a channel assignment method of the type described in which it is unnecessary, when one of the transmission channels is already in use at one of the base stations, to measure a carrier-to-interference ratio at each of other base stations adjacent to the base station under consideration, and at mobile stations that are currently present and alive in radio zones corresponding to the base station in question and the other base stations.

It is still another object of this invention to provide a channel assignment method of the type described that makes it possible for the cellular mobile radio communication network to deal with an increased amount of traffic simultaneously.

Other objects of this invention will become clear as the description proceeds.

In accordance with this invention, there is provided a channel assignment method for use in a cellular mobile radio communication network utilizing a plurality of channels and in which a base station of each radio zone assigns priority degrees to the channels with one of the priority degrees raised or lowered when this one of the priority degrees is assigned to one of the channels in which an interference signal has a power lower or higher than a predetermined level, respectively, this base station selecting from the channels in response to a channel assignment request and in accordance with the priority degrees a selected channel if the selected channel has a carrier-to-interference ratio higher than a preselected threshold level, wherein the threshold level is selected in dependence on the priority degrees.

DESCRIPTION OF THE PREFERRED EMBODIMENT

Figure 1:
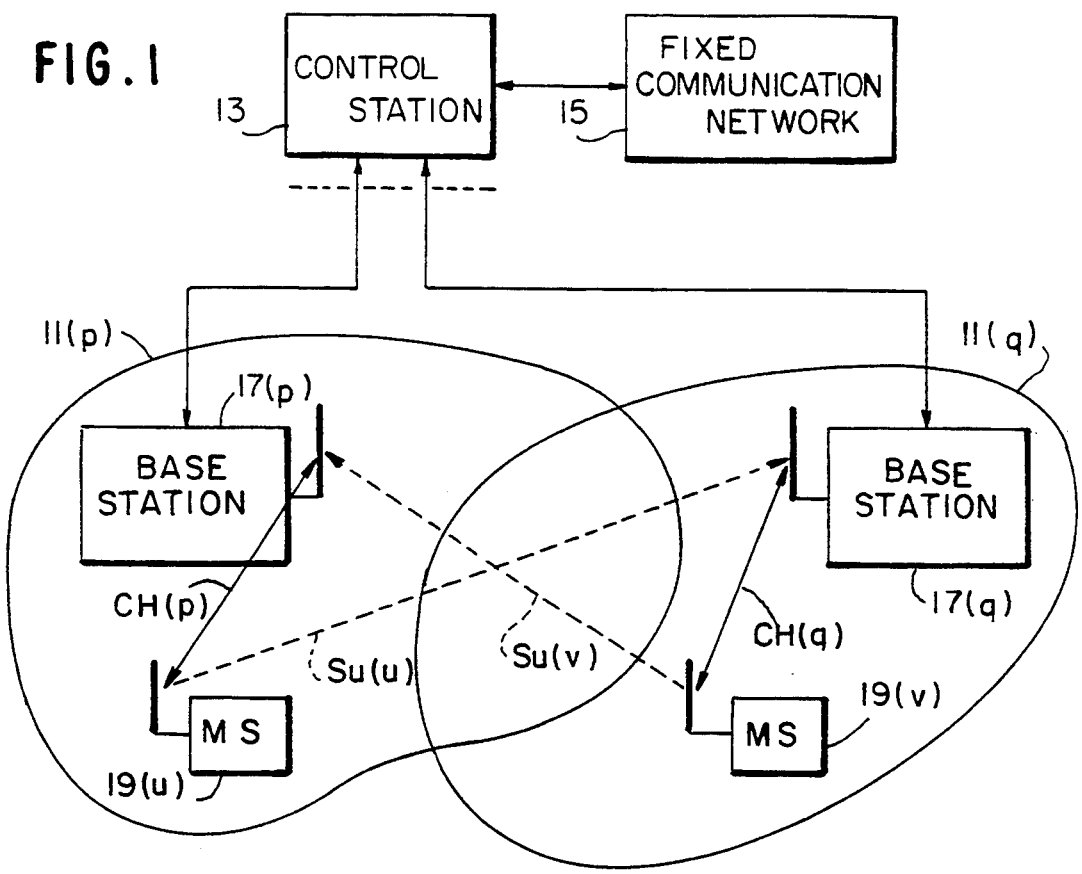
FIG. 1 is a schematic illustration of a cellular mobile radio communication network in which it is possible to use a method according to the instant invention.

Referring to FIG. 1, a cellular mobile radio communication network has a service area which is divided into a plurality of radio zones or cells. Two of adjacent ones of the radio zones, p-th and q-th cells or zones 11(p) and 11(q), are depicted, where p and q represent two of integers allotted to the radio zones. Being adjacent to each other, the p-th and the q-th cells 11 (suffixes omitted) have an overlapped area. It will be noticed that each of such cells 11 is bounded by a boundary which is irregular in shape in the manner described in the '101 patent. The service area of the network includes such cells 11.

The cellular mobile radio communication network comprises a control station 13 which may be located either within the service area or outwardly thereof and is connected to a fixed communication network 15 through wired communication channels. In the p-th and the q-th cells 11, p-th and q-th base stations or cell sites are situated in one-to-one correspondence to the cells 11. Such base stations 17 (suffixes omitted) are connected to the control station through wired and/or radio communication channels depicted by solid lines. Depending on the circumstances, the radio communication channel may include a transponder on board a satellite of a satellite communication system.

At least one mobile station is movable in general in the service area from one cell to another cell. In the example illustrated, u-th and v-th mobile stations (MS) 19(u) and 19(v) are currently present in the p-th and the q-th cells 11, where u and v represent two of integers allocated to such mobile stations 19 (suffixes omitted).

Each base station 17 is assigned with at least one transmission channel for use in communication with at least one of the mobile stations 19 that is currently present and alive in the cell 11 corresponding to the base station 17 under consideration. In this manner, a plurality of transmission channels are assigned to the cellular mobile radio communication network. Each base station 17 selects one of the transmission channels as a selected or favorite channel. It may be pointed out here that each radio zone is small sized and irregularly bounded in general in the manner previously described.

It will be assumed that a p-th channel CH(p) of the transmission channels is selected by the p-th base station 17(p) as the selected channel. A q-th channel CH(q) is selected as the selected channel by the q-th base station 17(q). It will furthermore be assumed that the u-th mobile station 19(u) transmits a u-th signal Su(u) towards the p-th base station 17(p) through the p-th channel. The v-th mobile station 19(v) transmits a v-th up signal Su(v) towards the q-th base station 17(q) through the q-th channel. The u-th up signal is received at the p-th base station 17(p) as a desired signal. The v-th up signal is received at the q-th base station 17(q) as a desired signal. Even when each of the mobile stations 19 is not within the overlapped area, the u-th up signal is received at the q-th base station 17(q) through the p-th channel as an interference or undesired signal. Similarly, the v-th up signal is received at the p-th base station 17(p) as an interference signal.

Figure 2:
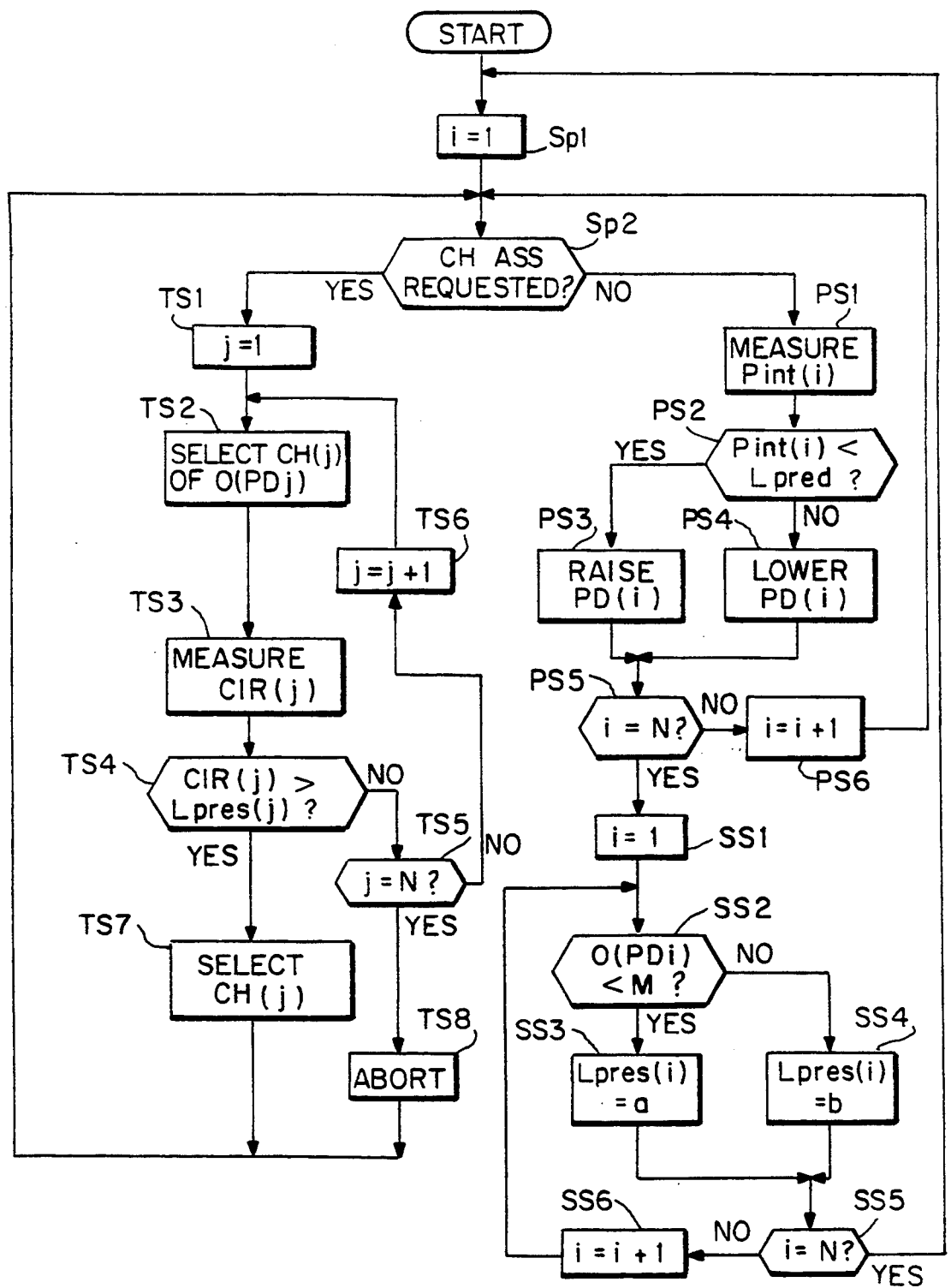
FIG. 2 shows a flow chart for use in describing an algorithm of a method according to a preferred embodiment of this invention.

Turning to FIG. 2 with reference to FIG. 1 continued, attention will be directed to an algorithm for use in a channel assignment method according to a preferred embodiment of this invention. It will be presumed merely for convenience of the description that first through N-th channels are utilized as the transmission channels in the cellular mobile communication network, where N represents a predetermined integer. The transmission channels are identified in this manner by channel numbers which start at 1 and serially increase up to N.

After start of the algorithm, each base station 17 gives initial priority degrees PD to the transmission channels of the cellular mobile radio communication network and updates the initial priority degrees to updated priority degrees $PD_u$ in accordance with the channel segregation scheme revealed in the '101 patent. More particularly, the initial priority degrees may have a common value or number at the base stations of the network. The initial priority degrees are raised and/or lowered during prosecution of primary steps of the method in the manner which will presently be described. It should be noted here that the primary steps are carried out while a request for channel assignment (CH ASS) is not present as a channel assignment request or call connection request.

In preparation for the primary steps for the time being, a value of 1 is given at a first preliminary step Sp1 to an i-th parameter i indicative of an i-th one of the channel numbers, an i-th channel CH(i) of the transmission channels assigned to the cellular mobile radio communication network. In connection with the i-th channel, an i-th initial priority degree PD(i) should be raised or lowered at one of the base stations 17 to an i-th updated priority degree $PD_u(i)$. At a second preliminary step Sp2, each base station checks whether or not a channel assignment request is present.

Assuming no channel assignment request is present, at a first primary step PS1, the base station measures the power of an i-th interference signal received through the i-th channel as an i-th interference signal power Pint(i). At a second primary step PS2, the base station judges whether or not the i-th interference signal power is less than a predetermined level $L_{pred}$.

If the i-th interference signal power is less than the predetermined level, the i-th initial priority degree is raised at a third primary step PS3. If the i-th interference signal power is not less than the predetermined level, the i-th initial priority degree is lowered at a fourth primary step PS4. Such raising and lowering of the i-th initial priority degree to the i-th updated priority degree are discussed in detail in the '101 patent.

At a fifth primary step PS5, the base station judges whether or not the i-th parameter is equal to N. If the i-th parameter is not equal to N, one is added at a sixth primary step PS6 to the i-th parameter to provide an incremented parameter. Thereafter, the sixth primary step returns to the first preliminary step.

The second preliminary step is repeated by using such incremented parameters. If a channel assignment request is detected at the second preliminary step thus repeated, the base station selects the selected channel in the manner which will later be described. Subsequently, the first through the sixth primary steps are repeated. If the channel assignment request is not yet present, the first through the sixth primary steps are repeated immediately following the repeated first and the second preliminary steps.

In this manner, the i-th initial priority degree is updated to the i-th updated priority degree. When the incremented parameter eventually reaches N at the fifth primary step carried out after several repetitions of the second preliminary step and the first through the sixth primary steps, the transmission channels of the cellular mobile radio communication network are given the updated priority degrees.

Figure 3:
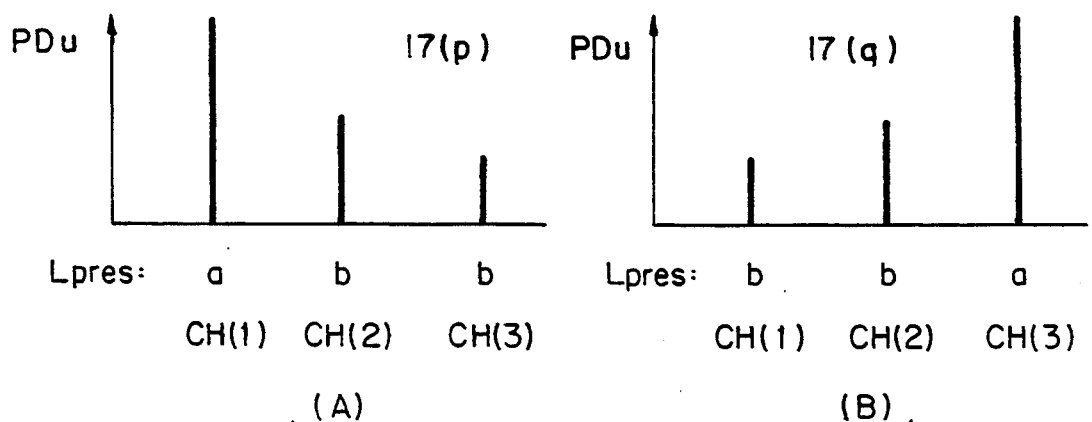
FIGS. 3(A) and (B) schematically show priority degrees assigned to a plurality of channels and exemplifies CIR threshold levels determined in accordance with the algorithm illustrated in FIG. 2.

Turning temporarily to FIGS. 3, (A) and (B), with FIG. 1 additionally referred to, it is assumed merely for simplicity of illustration that only first through third channels CH(1), CH(2), and CH(3) are utilized in the cellular mobile radio communication network. In other words, N is equal to three.

The updated priority degrees are exemplified by thick vertical lines as determined at the p-th and the q-th base stations $17(p)$ and $17(q)$ in connection with the first through the third channels. It is presumed that the updated priority degrees are rearranged in descending order for the p-th base station $17(p)$ and in ascending order for the q-th base station $17(q)$.

In the example being illustrated, the p-th base station $17(p)$ gives the highest (updated) priority degree to the first channel to use the first channel most frequently. The interference signal power has a high level in the first channel at the q-th base station $17(q)$. As a consequence, lower priority degrees are given to the first channel at the q-th base station $17(q)$ and at other similar base stations. If, however, the p-th base station $17(p)$ tries to select the first channel as the selected channel in response to a newly originating channel assignment request while the first channel is currently in use for communication with one of the mobile stations that is present and alive in the p-th cell $11(p)$, the newly originating channel assignment request is unavoidably blocked as a blocked request or call.

Preselected CIR threshold levels $L_{pres}$ are therefore selected in connection with the transmission channels of the cellular mobile radio communication network in dependency on the updated priority degrees in accordance with this invention. Each CIR threshold level will be referred to as an i-th CIR threshold level $L_{pres}(i)$ in connection with the i-th channel.

In the manner which will shortly be described, it is possible to select the CIR threshold levels from lower and higher levels a and b when a priority order number of a transmission channel is below or above a predetermined number or value M. This number or value M will presently become clear.

In the illustrated example, the predetermined number is set at two. The p-th base station $17(p)$ gives the lower level to the first CIR threshold level $L_{pres}(1)$ alone and the higher level to each of the second and the third CIR threshold levels $L_{pres}(2)$ and $L_{pres}(3)$. The q-th base station $17(q)$ gives the higher level to each of the first and the second CIR threshold levels $L_{pres}(1)$ and $L_{pres}(2)$ and the lower level only to the third CIR threshold level $L_{pres}(3)$ Turning back to FIG. 2, the preselected CIR threshold levels are selected as follows during prosecution of secondary steps of the method. At a first secondary step SS1, the value of 1 is again given to the i-th parameter to indicate the i-th channel once more. The updated priority degrees are identified by order numbers O(PD) 1, 2, ..., and N with the updated priority degrees of a common value differentiated, if present, from each other in compliance with the channel numbers. The i-th parameter now represents an i-th priority order O(PDi) of one of the priority orders that is given to the i-th channel. It should be noted that the i-th priority order may not necessarily be an i-th one of the priority orders.

The predetermined number or value M is selected from the order numbers. In general, the predetermined number M is greater than one and not greater than N. The predetermined number M is alternatively called a predetermined priority order.

At a second secondary step SS2, the base station judges whether or not the i-th priority order is less than the predetermined priority order. If the i-th priority order is less than the predetermined priority order, the lower level a is selected at a third secondary step SS3 as an i-th preselected level $L_{pres}(i)$ in connection with the preselected carrier-to-interference ratio of the i-th channel. At a fourth secondary step SS4, the higher level b is selected as the i-th preselected level if the i-th priority order is not less than the predetermined priority order.

At a fifth secondary step SS5, the i-th parameter is again compared with N. If the i-th parameter is equal to N, the fifth secondary step returns to the first preliminary step. If the i-th parameter is not equal to N, one is added at a sixth secondary step SS6 to the i-th parameter to provide a sum parameter. The second through the sixth secondary steps are repeated by using such sum parameters until the sum parameter eventually becomes equal to N at the fifth secondary step.

Continuing to refer to FIG. 2, assume that a channel assignment request is detected. Whenever the channel assignment request is detected at the second preliminary step Sp2, one of the transmission channels is selected as the selected channel by prosecution of tertiary steps of the method in the manner described in the following.

At a first tertiary step TS1, a value of 1 is given to a j-th parameter j representative of a h-th channel CH(j), where j is a variable from 1 and N inclusive. The j-th parameter furthermore represents, as a j-th order number, a j-th priority order O(PDj) which is of the type described in connection with the i-th priority order.

At a second tertiary step TS2, the j-th channel of j-th priority order is temporarily selected as a temporary channel. At a third tertiary step TS3, a j-th carrier-to-interference ratio CIR(j) of the j-th channel is measured. At a fourth tertiary step TS4, the j-th carrier-to-interference ratio is compared with a j-th selected level $L_{pres}(j)$ which is selected for use as the preselected threshold level in connection with the j-th channel at a pertinent one of the third and the fourth secondary steps.

If the j-th carrier-to-interference ratio is not higher than the j-th selected level, the j-th parameter is compared with N at a fifth tertiary step TS5. If the j-th parameter is not equal to N, one is added to the j-th parameter to provide an increased parameter at a sixth tertiary step TS6. The second through the sixth tertiary steps are repeated by using such increased parameters.

If the j-th carrier-to-interference ratio is higher than the j-th selected level, the j-th channel is actually selected at a seventh tertiary step TS7 as the selected channel. The seventh tertiary step returns to the second preliminary step in preparation for a next subsequent channel assignment request.

If it is impossible either to actually select the first channel as the selected channel or to actually select the selected channel in accordance with judgement carried out at the fourth tertiary step during repetition of the second through the sixth tertiary steps, even when the increased parameter eventually reaches N at the fifth tertiary step, for the channel assignment request detected at the second preliminary step, this channel assignment request aborts at an eighth tertiary step TS8. That is, this channel assignment request is blocked as the blocked request. The eighth tertiary step returns to the second preliminary step in preparation for a next following channel assignment request.

Reviewing FIGS. 1 through 3, it is now understood that each of the base stations of the cellular mobile radio communication network may comprise a microprocessor or the like for carrying out the algorithm illustrated with reference to FIG. 2. If necessary, it is possible to understand that the microprocessor is depicted as the block representative of each base station.

When the channel segregation scheme is used as it stands, a lower interference probability is had by each of the transmission channels that has a higher updated priority degree and is accordingly frequently used. A higher interference probability is had by each of the transmission channels that has a lower updated priority degree and is consequently less frequently used. If the threshold level were changed without regard to the updated priority degrees, the interference probability would remain substantially unchanged. As a result, an increase is inevitable in the blocking probability. Selection of threshold level in accordance with the velocity of the mobile station can not improve this undesirable tendency. In contrast, it is possible according to this invention to reduce the interference probability without adversely affecting the blocking probability.

While this invention has thus far been described in specific conjunction with only a single preferred embodiment thereof, it will now be readily possible for one skilled in the art to put this invention into practice in various other manners. Above all, it is possible to use two or more CIR threshold levels by selecting more than one predetermined priority order M.

For example, assume that highest, middle, and lowest levels L(H), L(M), and L(L) are used as three CIR threshold levels. In this event, it is decided at the second secondary step SS2 whether the above-mentioned i-th priority order O(PDi) is lower than a smaller priority order M(s), is not less than the smaller priority order and is less than a greater priority order M(g), or is not less than the greater priority order The i-th preselected level $L_{pres}(i)$ is rendered equal to the lowest level at the third secondary step SS3 if the i-th priority order is less than the smaller priority order. The i-th preselected level is rendered equal to a predetermined one of the middle and the highest levels at an additional secondary step SS(a) if the i-th priority order is not less than the smaller priority order is less than the greater priority order. The i-th preselected level is rendered equal to the other of the middle and the highest levels at the fourth secondary step SS4 if the i-th priority order is not less than the greater priority order. Although not depicted in FIG. 2, the additional secondary step is readily depicted between the third and the fourth secondary steps to proceed to the fifth secondary step SS5 like the third and the fourth secondary steps. At the fourth tertiary step TS4, it is possible to compare the carrier-to-interference ratio of the temporary or the j-th channel CIR(j) with the highest level which is selected at the third secondary step as the preselected level $L_{pres}(j)$ of this channel and to actually select the temporary channel at the seventh tertiary step TS7 as the selected channel if the carrier-to-interference ratio in question is higher than the highest level given to the preselected level of the temporary channel. In this manner, it is possible to use the CIR threshold level of a higher level as the CIR threshold level partly in connection with the channel or channels having a greater priority order.

What is claimed is:

1. A method of assigning channels in a cellular mobile radio communication network which utilizes a plurality of channels and in which a base station of each radio zone assigns priority degrees to said channels, comprising the primary steps of:

setting initial priority degrees;

assigning one of said priority degrees to one of said channels having an interference signal;

raising said one of said priority degrees if the interference signal has a power lower than a predetermined level, and lowering said one of said priority degrees if the interference signal has a power higher than a predetermined level;

receiving, by said base station, a channel assignment request;

selecting, by said base station, a selected channel from said channels in response to said channel assignment request and in accordance with said priority degrees if said selected channel has a channel-to-interference ratio higher than a preselected threshold level, wherein said threshold level is based on said priority degrees of each said channel; and updating said priority degrees by raising and lowering said priority degrees during the primary steps, the secondary steps of selecting said threshold level in connection with each of said channels, the tertiary steps of:

selecting said selected channel with reference to the threshold level selected during said secondary step;

selecting said threshold level to be a lower level if an examined priority degree of said updated priority degrees is greater than a predetermined value, and selecting said threshold level to be a higher level if the examined priority degree is less than the predetermined value, the examined priority degree corresponding to one of said selected channel and identifying said channels as first through N-th channels, where N represents a predetermined number that is an integer, and the preliminary steps of:

a first preliminary step of setting to 1 an i-th parameter variable to be successively incremented to represent each of the identified channel numbers given to said first through said N-th channels to indicate an i-th channel; and a second preliminary step of judging the presence or absence of said channel assignment request, said primary steps being performed while said channel assignment request is absent.

2. A channel assignment method as claimed in claim 1, wherein said primary steps comprise a first primary step of measuring an i-th interference signal power received through said i-th channel, a second primary Step of judging whether or not said i-th interference signal power is lower than said predetermined level, a third primary step of raising an i-th initial priority degree assigned to said i-th channel if said i-th interference signal power is lower than said predetermined level, a fourth primary step of lowering said i-th initial priority degree if said i-th interference signal power is not lower than said predetermined level, a fifth primary step of comparing said i-th parameter with N, and a sixth primary step of adding one to said i-th parameter to provide an incremented parameter if said i-th parameter is less than N, said second preliminary step and said first through said sixth primary steps being repeated by using said incremented parameter until said incremented parameter eventually becomes equal to N at said fifth primary step.

3. A channel assignment method as claimed in claim 2, wherein said secondary steps comprise a first secondary step of giving 1 to said i-th prameter which now represents one of a plurality of priority orders that is given to said i-th channel, a second secondary step of judging whether or not said one of the priority orders is less than a predetermined priority order, a third secondary step of giving a first preselected level of a plurality of levels to said threshold level if said one of the priority orders is less than said predetermined priority order, a fourth secondary step of giving a second preselected level of said plurality of levels to said threshold level if said one of the priority orders is not less than said predetermined priority order, a fifth secondary step of comparing said i-th parameter with N, and a sixth secondary step of adding one to said i-th parameter to provide a sum parameter if said i-th parameter is not equal to N at said fifth secondary step, said first preselected level being lower than said second preselected level, said first and said second preliminary steps and said first through said sixth secondary steps being repeated if said i-th parameter is equal to N at said fifth secondary step, said first through said sixth secondary steps being repeated by using said sum parameter until said sum parameter eventually becomes equal to N at said fifth secondary step.

4. A channel assignment method as claimed in claim 3, wherein said first and said second preselected levels are lower and higher levels of two levels used as said plurality of levels.

5. A channel assignment method as claimed in claim 3, wherein said tertiary steps are carried out whenever said channel assignment request is detected at said second preliminary step.

6. A channel assignment method as claimed in claim 5, wherein said tertiary steps comprise a first tertiary step of giving 1 to a j-th parameter representative of a j-th channel, where j is variable between i and N, both inclusive, a second tertiary step of temporarily selecting said j-th channel as a temporary channel, a third tertiary step of measuring a j-th carrier to interference ratio of said temporary channel, a fourth tertiary step of judging whether or not said j-th carrier to interference ratio is greater than a j-th level of said plurality of levels that is given to the threshold level of said j-th channel at one of said third and said fourth secondary steps, a fifth tertiary step of comparing said j-th parameter with N if said j-th carrier to interference ratio is not greater than said j-th level, a sixth tertiary step of adding one to said j-th parameter to provide an increased parameter, and a seventh tertiary step of selecting said j-th channel as said selected channel if said j-th carrier to interference ratio is greater than said j-th level, said first through said sixth tertiary steps being repeated by using said increased parameter until said increased parameter eventually becomes equal to N at said fifth tertiary step, said first through said sixth tertiary steps aborting unless said j-th channel is selected as said selected channel at said seventh tertiary step even after said increased parameter eventually becomes equal to N at said fifth tertiary step.

* * * * *

UNITED STATES PATENT AND TRADEMARK OFFICE
CERTIFICATE OF CORRECTION

PATENT NO.   : 5,448,761
DATED        : September 5, 1995
INVENTOR(S)  : Akihisa USHIROKAWA It is certified that error(s) appears in the above-identified patent and that said Letters Patent is hereby corrected as shown below:

Col. 10, line 11, delete "prameter" and insert --parameter--.

Col. 10, line 45, delete "i" and insert --1--.

Signed and Sealed this

Fourteenth Day of May, 1996

Attest:

BRUCE LEHMAN

*Attesting Officer*    *Commissioner of Patents and Trademarks*